United States Patent
Salokannel (10) Patent No.: US 7,808,966 B2
(45) Date of Patent: Oct. 5, 2010

(54) DEVICE EMPLOYMENT OF MULTIPLE BEACON SLOTS IN A DISTRIBUTED NETWORK

(75) Inventor: Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 11/137,505

(22) Filed: May 26, 2005

(65) Prior Publication Data

US 2005/0249167 A1 Nov. 10, 2005

Related U.S. Application Data

(63) Continuation-in-part of application No. 10/838,217, filed on May 5, 2004, and a continuation-in-part of application No. 10/847,876, filed on May 19, 2004, now Pat. No. 7,496,081.

(51) Int. Cl.
*H04B 7/212* (2006.01)
*H04W 4/00* (2009.01)
*H04L 12/43* (2006.01)

(52) U.S. Cl. .................. 370/348; 370/338; 370/458; 370/442

(58) Field of Classification Search ............... 455/41.2; 370/458, 442
See application file for complete search history.

(56) References Cited

U.S. PATENT DOCUMENTS

| | | | |
|---|---|---|---|
| 6,452,936 B1 | 9/2002 | Shiino | |
| 6,603,799 B1 | 8/2003 | Hlasny | |
| 6,757,323 B1 | 6/2004 | Fleming et al. | |
| 6,897,567 B2 | 4/2005 | Callaway et al. | |
| 6,895,248 B1 * | 5/2005 | Akyol et al. | 455/452.1 |
| 6,934,284 B1 * | 8/2005 | Danielson et al. | 370/384 |
| 6,975,614 B2 | 12/2005 | Kennedy | |
| 6,980,541 B2 | 12/2005 | Shvodian | |
| 7,092,353 B2 * | 8/2006 | Laroia et al. | 370/210 |
| 7,095,754 B2 | 8/2006 | Benveniste | |
| 7,193,986 B2 * | 3/2007 | Scanlon et al. | 370/338 |
| 7,222,175 B2 | 5/2007 | Knauerhase et al. | |
| 7,236,747 B1 * | 6/2007 | Meacham et al. | 455/69 |

(Continued)

FOREIGN PATENT DOCUMENTS

JP    2001189951    7/2001

(Continued)

OTHER PUBLICATIONS

Jay O'Conor, "MBOA Wireless Medium Access Control (MAC) Specification for High Rate Wireless Personal Area Networks (WPANS)", Draft 0.5; Apr. 2004.

(Continued)

*Primary Examiner*—Vincent P Harper
*Assistant Examiner*—Omoniyi A Obayanju
(74) *Attorney, Agent, or Firm*—Locke Lord Bissell & Liddell (57) ABSTRACT

Multiple nodes communicate using repeating patterns of superframes, where each of the superframes includes a beacon period. A beacon slot in a first Media Access Slot (MAS) is reserved by the plurality of nodes. This reserved slot occurs in the beginning of the beacon period and is used for communicating information relating to the superframe configuration. This information may involve adjustments to the number of MASs reserved for beaconing.

27 Claims, 10 Drawing Sheets

U.S. PATENT DOCUMENTS

| | | | |
|---|---|---|---|
| 7,280,518 B2 | 10/2007 | Montano et al. | |
| 7,502,342 B2 | 3/2009 | Kim et al. | |
| 2003/0016732 A1* | 1/2003 | Miklos et al. | 375/132 |
| 2003/0152059 A1 | 8/2003 | Odman | |
| 2003/0163579 A1 | 8/2003 | Knauerhase et al. | |
| 2003/0231607 A1 | 12/2003 | Scanlon et al. | |
| 2004/0105412 A1 | 6/2004 | He et al. | |
| 2004/0117497 A1 | 6/2004 | Park | |
| 2004/0192284 A1 | 9/2004 | Vaisanen et al. | |
| 2004/0218683 A1 | 11/2004 | Batra et al. | |
| 2004/0253996 A1 | 12/2004 | Chen et al. | |
| 2005/0174964 A1* | 8/2005 | Orlik et al. | 370/329 |
| 2006/0092909 A1* | 5/2006 | Ho | 370/348 |
| 2006/0140215 A1 | 6/2006 | Fleming | |
| 2006/0239220 A1* | 10/2006 | Celentano et al. | 370/328 |
| 2007/0274206 A1 | 11/2007 | Habetha et al. | |
| 2008/0259877 A1 | 10/2008 | Habetha | |

FOREIGN PATENT DOCUMENTS

| | | |
|---|---|---|
| JP | 200440646 | 2/2004 |
| RU | 2066740 | 9/1996 |
| RU | 2 149 509 C1 | 5/2000 |
| RU | 2 173 031 C2 | 8/2001 |
| RU | 2 198 479 C2 | 2/2003 |
| RU | 2 219 663 C2 | 12/2003 |
| WO | WO 02/39668 A2 | 5/2002 |
| WO | WO 02/065707 A2 | 8/2002 |
| WO | WO 03/030459 A2 | 4/2003 |
| WO | WO2005/076533 A1 | 8/2005 |
| WO | WO 2005/076533 A1 | 8/2005 |
| WO | WO 2005/076544 A1 | 8/2005 |
| WO | WO 2005/107164 A1 | 11/2005 |

OTHER PUBLICATIONS

Notification Concerning Transmittal of International Preliminary Report on Patentability (Chapter I of the Patent Cooperation Treaty), International Application No. PCT/IB2005/001162 (International Publication No. WO 2005/107164 A1), including PCT IPRP and Written Opinion of the ISA, Nov. 16, 2006.

PCT Search Report, International Application PCT/IB2005/001162 (WO 2005/107164 A1), Oct. 4, 2005.

Priority Document—U.S. Appl. No. 60/542,529, filed Feb. 6, 2004.

Priority Document—U.S. Appl. No. 60/628,410, filed Nov. 16, 2004.

Decision on Grant Patent for Invention Issued by the Russian Patent Office on Apr. 29, 2009 for RU 2006137567/09 (040891).

Japanese Patent Office Action dated Jun. 1, 2009 for Japanese Application No. 2007-507868.

Distributed Medium Access Control (MAC) for Wireless Networks, MultiBand OFDM Alliance, WiMedia Alliance, Release 1.0 Dec. 8, 2005, pp. 1-176.

* cited by examiner

DEVICE EMPLOYMENT OF MULTIPLE BEACON SLOTS IN A DISTRIBUTED NETWORK

CROSS REFERENCE TO RELATED APPLICATIONS

This application is a continuation in part of the following U.S. Applications:
1. application Ser. No. 10/838,217, filed on May 5, 2004, entitled "Adaptive Beacon Period in a Distributed Network," and
2. application Ser. No. 10/847,876, filed on May 19, 2004, entitled "Adaptive Beacon Period in a Distributed Network."

These applications are incorporated herein by reference in their entirety.

FIELD OF THE INVENTION

The present invention relates to wireless communications. More particularly, the present invention relates to the allocation of resources in wireless communications networks.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

IEEE 802.15.3 defines an ad hoc wireless short-range network (referred to as a piconet) in which a plurality of devices may communicate with each other. The timing of piconets is based on a repeating pattern of "superframes" in which the network devices may be allocated communications resources. Currently, the MultiBand OFDM Alliance (MBOA) is defining a media access control (MAC) layer for Ultra Wide Band (UWB) radios in relation with the IEEE 802.15.3. More information about Multiband OFDM can be found from http://www.multibandofdm.org/ and http://www.wimedia.org.

The first version of the MAC specifies a superframe that is 65536 microseconds in duration. This superframe contains 256 equally spaced Media Access Slots (MAS). Each MAS can be used for data communication. Thus, the length of each MAS is 256 microseconds.

According to this initial MAC version, the first eight MASs of the superframe are always reserved for the transmission of beacons. The time period covering these eight slots is called a Beacon Period (BP). During the Beacon Period, each MAS contains three beacon slots. Therefore, the total number of available beacon slots per superframe is twenty four. During a beacon slot, only a single beacon can be sent.

Unfortunately, because the initial MAC is inflexible in the number of beacon slots, it is likely that for any given situation, there will be either too many or too few available beacon slots. For instance, the maximum number of twenty four beacon slots specified by the initial MAC version is for devices that are located within two hops of each other. This number of beacon slots may be sufficient because the operating range provided by the UWB physical layer (PHY) is small. However, a greater number of beacon slots may sometimes be needed. This could be the case in scenarios involving, for example, rush hour trains or buses.

Conversely, situations may occur where there are too many beacon slots. For instance, when a network includes just one device, only two beacon slots are necessary during the BP. One of these slots is for beaconing and the other is for another device's beacon when it joins the network. Similarly, if two devices are present in a network, then only two slots during the BP are in use. Additionally, one slot must be reserved for a new device.

The initial MAC version specifies that every device operating in an active mode must listen to every beacon slot in a BP. Therefore, in the above mentioned situation involving two devices, the initial MAC version requires the two devices to monitor (or "listen to") twenty two empty beacon slots. This results in unnecessary power consumption for the two devices.

Accordingly, the current inflexibility in the number of beacon slots can have the unfortunate effect of increasing device power consumption and/or decreasing available communications capacity. These effects are highly likely given the general nature of ad hoc networks, in which situations vary greatly.

Further, in cases where a device needs to inform one or more of its neighboring devices that a change in the number of beacon slots is required, there is need for mechanism that allows the device to make such an announcement while allowing the device to maintain its assigned beacon slot.

SUMMARY OF THE INVENTION

The present invention provides a wireless communications network. This network includes one or more wireless communications devices and a wireless transmission medium. The one or more wireless communications devices transmit beacon messages across the wireless transmission medium during a beacon period that is within a superframe. The beacon period has a number of beacon slots that is dynamically adjusted. This adjustment may be based, for example, on the number of wireless communications devices in the network.

The present invention also provides a wireless communications device having a receiver, a transmitter, and a controller. The receiver receives beacon messages across a wireless transmission medium. Based on the received beacon messages, the controller determines a number of beacon slots for a group of one or more devices (which includes the wireless communications device). To allocate the determined number of beacon slots to the group, the transmitter sends a generated beacon message.

The determined number of beacon slots may be within a beacon period of a superframe. In aspects of the present invention, each of the received beacon messages identifies one or more devices within a same beaconing group, and beacon slots employed by the one or more devices.

The generated beacon message may indicate a number of used beacon slots that are visible to the device. Also, the generated beacon message indicates a relative usage of beacon slots that are visible to the device.

In addition, the present invention provides a method and computer program product in which a plurality of beacon messages are received across a wireless transmission medium; a number of beacon slots is determined for a group of one or more devices based on the received beacon messages; and a beacon message is sent to allocate the determined number of beacon slots to the group.

In aspects of the present invention, a beacon slot in a beacon period may be reserved for communications involving the configuration of superframes. For instance, the present invention provides a system including multiple nodes communicating wirelessly using repeating patterns of superframes. Each of the superframes has at least one beacon period. The nodes reserve at least one beacon slot in a first Media Access Slot (MAS) that occurs in the beginning of the at least one beacon period. This beacon slot is for communicating information relating to the superframe configuration. For instance, this slot is for adjusting the number of the MASs reserved for beaconing in the superframes.

According to aspects of the present invention, a device joins a wireless communications network that employs a repeating time interval within a transmission medium. This repeating time interval includes a plurality of beacon slots designated for beacon transmissions. The device obtains one of the plurality of beacon slots as an assigned slot and transmit a beacon message during the assigned slot. In addition, the device may transmit the beacon message during a signaling slot of the repeating time interval that is reserved for sharing network information between devices of the wireless communications network. This signaling slot may comprise one or more beacon slots in the beginning of the beacon transmission period. Further, according to embodiments of the present invention, the signaling slot may comprise one or more beacon slots of a first media access slot (MAS), which may include three first occurring slots within the repeating time interval.

This transmission during the signaling slot may occur for various reasons, such as a random occurrence of a predetermined probability or increasing the number of beacon slots within the repeating time interval. Moreover, the signaling slot may be randomly selecting from among two or more predefined signaling slots within the beacon period. The device may discontinue transmission of the beacon message during the signaling slot for various reasons, such as the occurrence of one or more events, or the passing of a predetermined amount of time.

The present invention allows for the efficient utilization of communications resources and reduces power consumption in communications devices. Further features and advantages of the present invention will become apparent from the following description, claims, and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
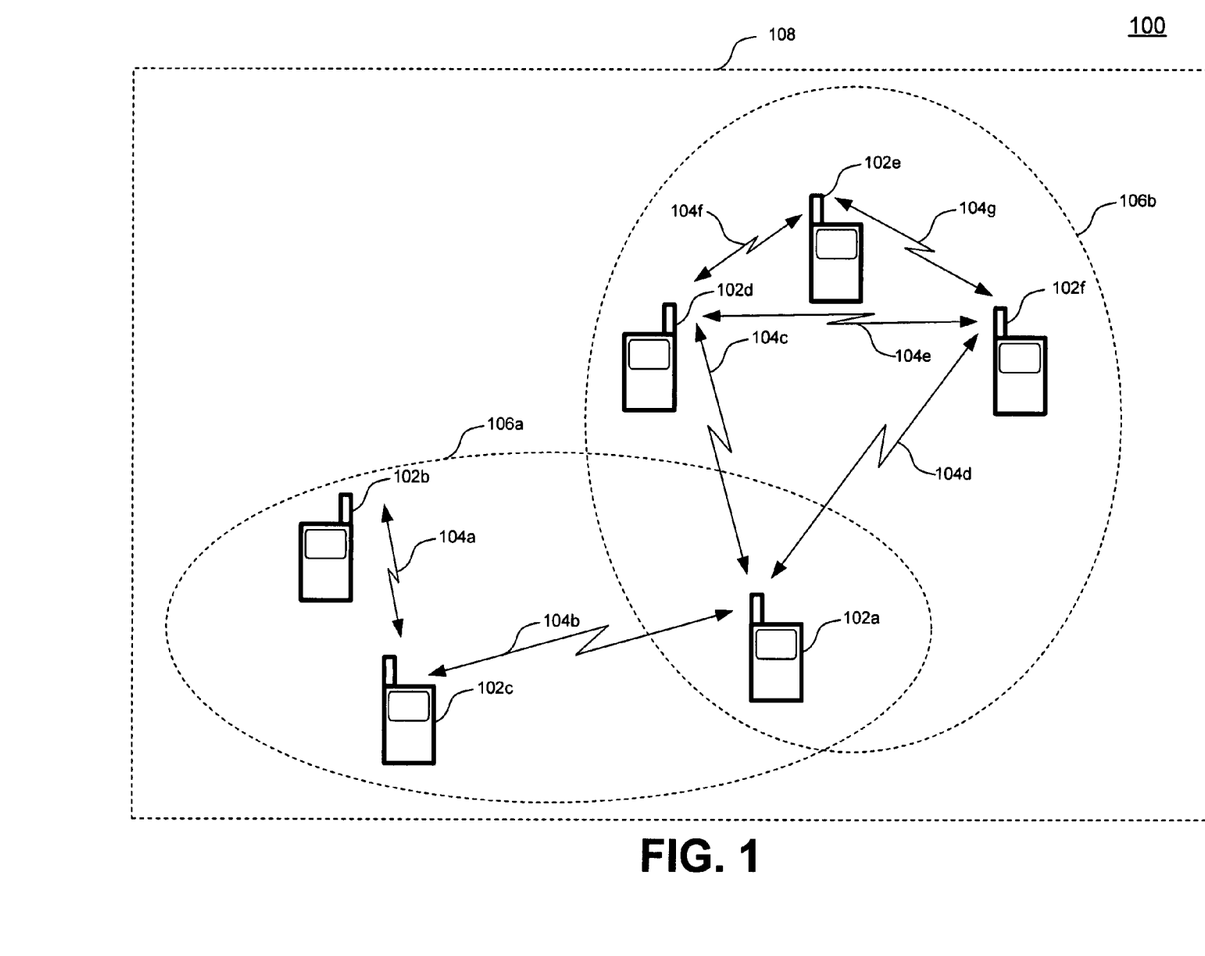
FIG. 1 is a diagram of an exemplary operational environment.

Before describing the invention in detail, it is helpful to first describe an environment in which the present invention may be used. Accordingly, FIG. 1 is a diagram of an exemplary operational environment in which the present invention may be employed. In this environment, a plurality of wireless communications devices (DEVs) 102 may exchange information with each other across a wireless personal area network (WPAN) 100. This exchange of information may occur through various communications paths or "hops" 104 that exist between DEVs 102.

Network 100 includes a plurality of beaconing groups 106. Each beaconing group 106 includes a set of DEVs 102 that are within radio range of each other during a beaconing period. For instance, a beaconing group 106a includes DEVs 102a, 102b, and 102c. Also, a beaconing group 106b includes DEVs 102a, 102d, 102e, and 102f. Accordingly, DEV 102a belongs to both beaconing groups 106a and 106b.

The environment of FIG. 1 shows a cluster 108, which includes a set of DEVs 102 that are within the radio range of a particular DEV 102 (i.e., DEV 102a). Accordingly, cluster 108 includes DEVs 102a-f of beaconing groups 106a and 106b.

II. Superframe

Figure 2:
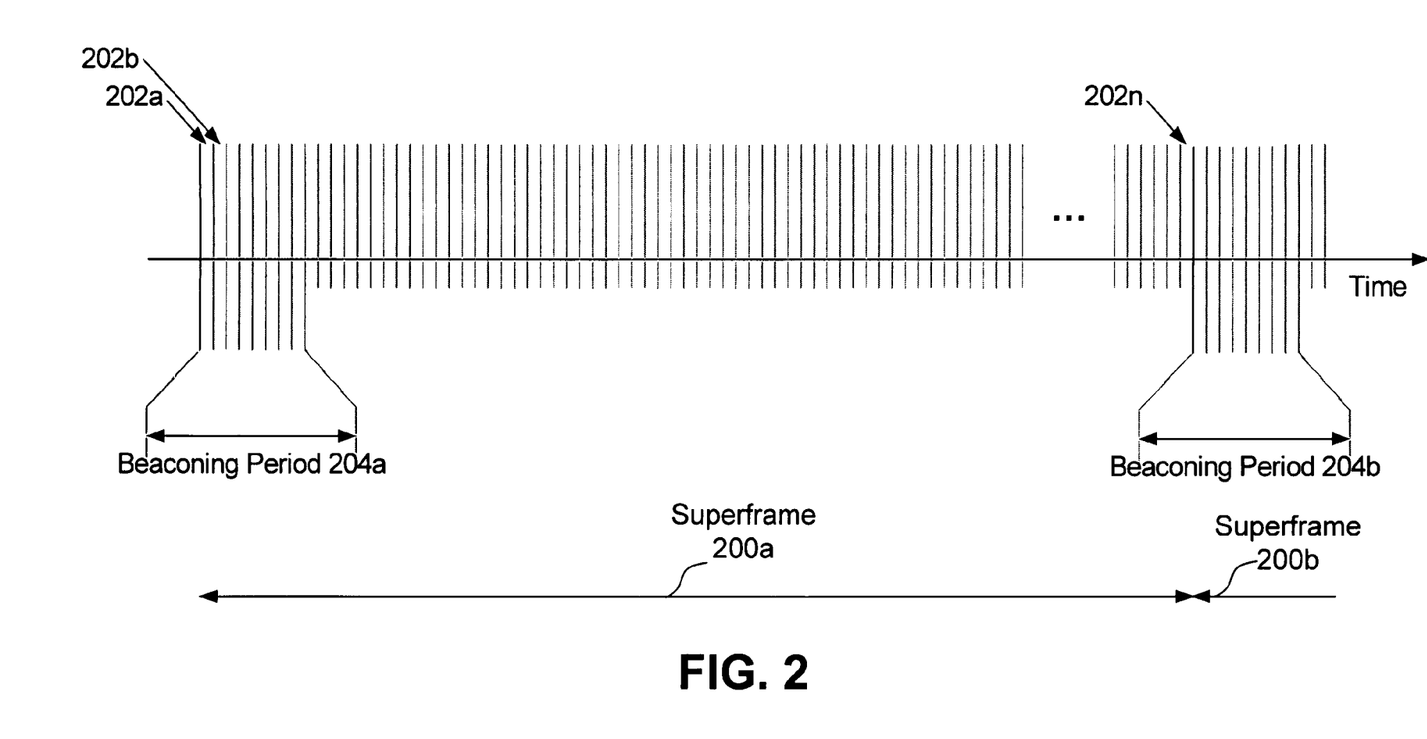
FIG. 2 is a diagram of an exemplary superframe.

Transmissions according to the current MBOA MAC version are based on a repeating pattern called a superframe. FIG. 2 is a diagram showing an exemplary superframe format. In particular, FIG. 2 shows consecutive exemplary superframes 200a and 200b.

Superframe 200a includes a plurality of media access slots (MASs) 202a-n. As shown in FIG. 2, multiple MASs 202 in each superframe 200 are grouped into beaconing periods (BP) 204. For instance, FIG. 2 shows that superframe 200a has a BP 204a and superframe 200b has a BP 204b. As discussed above, the initial MBOA MAC version provides for a beaconing period having 24 beacon slots. These slots extend across eight contiguous MASs. Therefore, when implemented according to this version, each MAS 202 that is within BP 204 contains three beacon slots.

According to the initial MBOA MAC version, only beacon frames may be transmitted according to a beacon period protocol during BPs 204. However, during other portions of superframes 200, devices are allowed to reserve portions of the RF channel (make "reservations") for use according to specific access methods.

III. Beacons

To maintain coordination between communicating devices, the initial MBOA MAC version specifies that devices (such as DEVs 102) transmit a beacon message.

The transmission of beacons in a cluster or separate clusters allows for fast device discovery and provides efficient support for mobility. Moreover, beacons provide the basic timing for the network and may transmit information regarding isochronous reservations. The employment of beacons alleviates the need for a network infrastructure by distributing functions across all nodes. Accordingly, the initial MBOA MAC version does not require an access point or central coordinator for the WPAN network.

According to the initial MBOA MAC version, devices (e.g., DEVs 102) that intend to participate in communication with other devices send beacons during beaconing periods (e.g., BPs 204). Further, these devices scan for beacons transmitted by other devices during the beaconing period. However, certain devices may enter a "hibernation" state. When operating in this state, a device refrains from transmitting beacons. However, the device does not relinquish its particular beacon slot.

In short, each device provides in the beacon message its MAC address and the place of the beacon. For example, three active devices in a group may inform that they use beacon slots 1, 3 and 4 of 6 available beacon slots (according to the flexible allocation techniques of the present invention). Generally, slots 2, 5 and 6 would be available. However, when an additional hibernating device belongs to the same group, at least one of the active devices informs that slot one of these slots (e.g., slot 6) is reserved for the hibernating device Therefore, a new device joining the network would have slots 2 and 5 available.

Beacons may include one or more information elements (IEs) containing information pertaining to the DEVs and/or the network. One such IE specified by the initial MBOA MAC version is called a Beacon Period Occupancy IE (BPOIE). The BPOIE is used to provide a list of devices in the same beaconing group and the beacon slots that those devices employ during the beaconing period. This information can be used to detect beacon collisions. The initial MBOA version specifies that devices shall include a BPOIE in all beacons that they transmit.

The BPOIE contains various information. This information includes a beacon slot information ("Beacon slot info") field for each device in the beaconing group (such as one of beaconing groups 106). Each of these fields includes a beacon slot number and a corresponding device identifier ("DEVID").

Upon reception of a beacon frame, a device saves the DEVID of the sender and the slot number where the beacon is received. This information is included in the BPOIE sent in the following superframe. Only the information of beacons received during a superframe is included in the BPOIE sent in the following superframe.

Devices select their beacon slots among the idle beacon slots. Also, in subsequent superframes, devices send their beacons in the same beacon slot unless a collision is detected. If a particular device identifier (DEVID) is missing in the BPOIE from a neighboring beacon during predetermined number of consecutive superframes, device(s) receiving the neighboring beacon are instructed by the initial MBOA MAC version to indicate this beacon slot as an idle slot in the following superframe.

IV. Beacon Period Flexibility

In embodiments of the present invention, the number of slots during the beacon period is made flexible. This flexibility may be based on, for example, the number of devices in the network. This feature provides various advantages, such as increased communications capacity and reduced power consumption in devices.

Accordingly, in aspects of the present invention, a mapping may be provided between the number of devices in a network (e.g., devices within two hops from each other) and the length of the beacon period (i.e., the number of MASs in the BP). Table 1, below, provides an example of such a mapping. This mapping is in the context of the initial MBOA version's superframe format modified to have a flexible number of MASs

TABLE 1

| Number of Devices | Number of MASs in current BP | Available Beacon Slots |
|---|---|---|
| 1 | 1 | 3 |
| 2 | 2 | 6 |
| 3 | 2 | 6 |
| 4 | 2 | 6 |
| 5 | 3 | 9 |
| 6 | 3 | 9 |

In the example of Table 1, there are normally at least two free beacon slots during the BP. However, as new device(s) join the network, the number of beacon slots is increased whenever the number of free beacon slots decreases to a predetermined number (e.g., to one free beacon slot). For example, Table 1 shows the total number of beacon slots being increased (e.g., from 3 to 6, 6 to 9, 9 to 12, etc.) based on the number of devices in the network.

In operational situations, the exact number of devices within two hops may not be known by each device. However, as described herein, information providing an indication of the number of devices may be communicated. Accordingly, flexibility in the number of employed MASs may be provided in various ways.

One such way is in incremental steps, where the adjacent rows in a mapping table, such as Table 1, are viewed as an increment. Accordingly, adjustments in the number of employed MASs may be made in single increments. However, in certain situations (such as when multiple networks merge) a single adjustment in the number of employed MASs may span multiple increments.

Table 1 is provided as an example. Accordingly, variations from this table are within the scope of the present invention. For example, the number of free slots may be kept somewhat higher than in Table 1. Such mappings offer trade-offs with efficiency.

V. Operation

Various mechanisms may be employed to adjust (i.e., increase or decrease) the number of employed beacon slots. For instance, embodiments of the present invention employ an IE that indicates a particular BP length. This IE may be implemented in various ways. For example, in embodiments, the BP length is included in each beacon that a device transmits. Accordingly, this IE may be provided by a modified BPOIE that, unlike the BPOIE of the initial version, includes a BP length field. This field may be an indication (or "announcement") by a particular device of the number of used beacon slots that are visible to it (i.e., that the device can receive). Thus, this field may reflect the number of used beacon slots from multiple beaconing groups.

When no piconet exists, a first device in a network determines a beacon period start time (BPST). At this start time, the first device sends its own beacon containing a BPOIE. This BPOIE may include a BP length field, according to embodiments of the present invention. Over time, additional device(s) may join the network. Through the exchange of information in, (for example, in beacon messages) beacon period lengths are determined and dynamically adjusted based on network characteristics.

Figure 3:
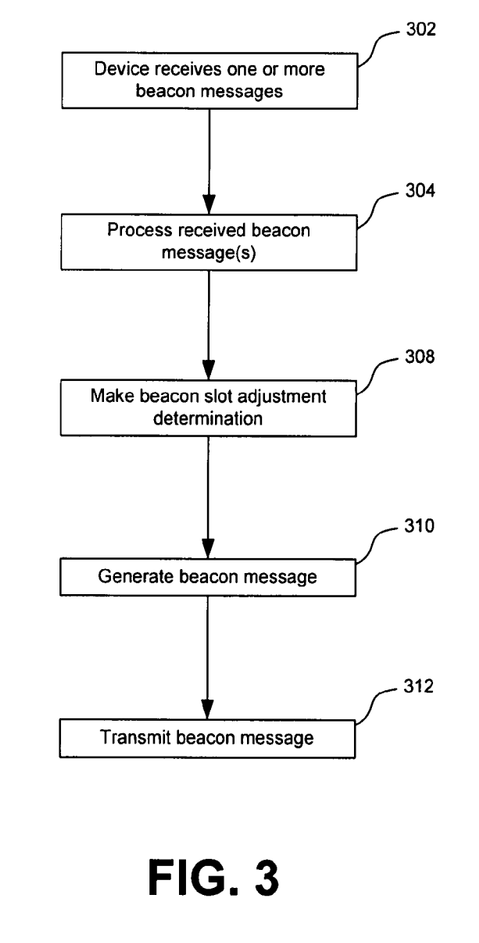
FIG. 3 is a flowchart illustrating an operation of a wireless communications device according to an aspect of the present invention.

FIG. 3 is a flowchart illustrating an operation of a wireless communications device, such as one of DEVs 102, according to an aspect of the present invention. This operation includes a step 302 in which the device receives one or more beacon messages. In embodiments of the present invention, these message(s) are received during a single superframe.

In a step 304, the device processes the one or more beacon messages. This step may include retrieving information from various fields in each beacon transmission and storing the fields in a memory. In addition, step 304 may include determining the number of device(s) that are within its view. This number of devices may be from multiple beacon groups.

In a step 308, a beacon slot adjustment determination is made. In this step, the device determines whether an increase or a decrease in the number of beacon slots employed by its beaconing group(s) is to occur. Performance of this step may be based on the information retrieved and/or determined in step 304.

In a step 310, the device generates a beacon message. This beacon message is based on the beacon message(s) received in step 302. For instance, for a particular beaconing group, the generated beacon message may include a device identifier and a beacon slot identifier for each device in the group. In addition, this message includes information indicating the number of allocated beacon slots. Accordingly, this information may be based on any beacon slot adjustment determination that is performed in step 308. This information may be in the form of a BP length field.

In a step 312, the beacon message generated in step 310 is transmitted. In embodiments, this information is transmitted in a superframe immediately following a preceding superframe during which the beacon message(s) were received in step 302. This transmission is sent to the device's beaconing group(s) (e.g., in BP(s) corresponding to the beaconing group(s)). In turn, each device in the group may likewise perform the steps of FIG. 3 based on the reception of this transmission and any other received beacon messages.

As described above, embodiments of the present invention employ an IE having a BP length field that allows a device to indicate or announce the number of used beacon slots that are visible to it. Accordingly, in step 308, a beacon slot adjustment determination may be made based on the number of used slots indicated by the visible devices in comparison to the number of used slots in the beaconing group. For instance, if any of the devices in same beaconing group announce more visible used beacon slots than are currently announced by one or more of its neighboring devices, then the one or more neighboring devices may adapt by increasing of the number of allocated beacon slots correspondingly. This allocation may be performed in the following superframe.

In addition to the above techniques for determining whether to increase the number of beacon slots in a beacon period, various techniques may be employed to determine whether the number of beacon slots in a beacon period should be decreased.

As an alternative to the above decreasing technique, a lone device uses a predetermined number of BP slots (such as three beacon slots) for beaconing. However, when other device(s) join the lone device's network, then the number of beacon slots is increased to a predetermined value (such as 24). Thus, the lone device conserves power until other devices join its network.

Accordingly, devices may also determine a beacon slot adjustment based on BP length field(s) received from other devices in their beaconing group(s). This determination may also be made in step 308. As described above, such adjustments may involve a decrease or an increase in the number if beacon slots for a group. In embodiments such increases may be limited by a maximum slot amount, such as 24. However, beacon periods having greater than 24 beacon slots are within the scope of the present invention.

Further, in embodiments, devices within a beaconing group always use the lowest possible free beacon slots counting from the start of beacon period start time (BPST). This advantageously minimizes the duration of the beacon period, thereby providing for an efficient utilization of communications resources.

VI. Beacon Period Field

Figure 4:
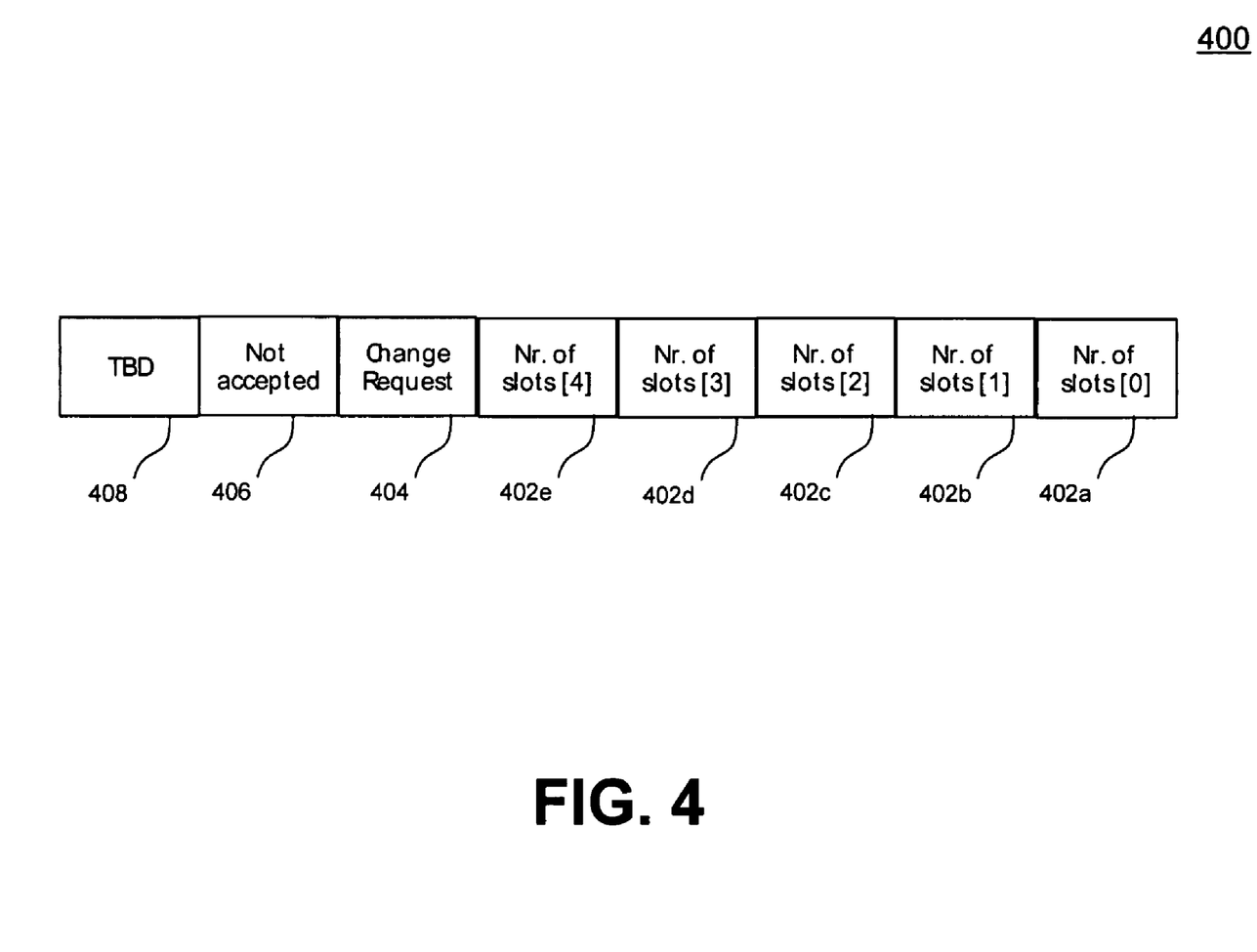
FIG. 4 is a diagram of a field that may be transmitted by devices according to an embodiment of the present invention.

FIG. 4 is a diagram showing an exemplary BP length field 400 according to an embodiment of the present invention. As described above, this field may be included in a IE, such as a BPOIE that is modified from the initial MBOA MAC version. As shown in FIG. 4, field 400 is represented by an octet (i.e., eight bits). Bits 402*a*-402*e* are reserved for encoding a BP field length. Accordingly, these bits may be used to represent the codes of Tables 2 and 3. Field 400 also includes a request to change bit 404 and a not accepted bit 406. As discussed above, these bits may be used to decrease the number of BP slots.

VII. Wireless Communications Device

Figure 5:
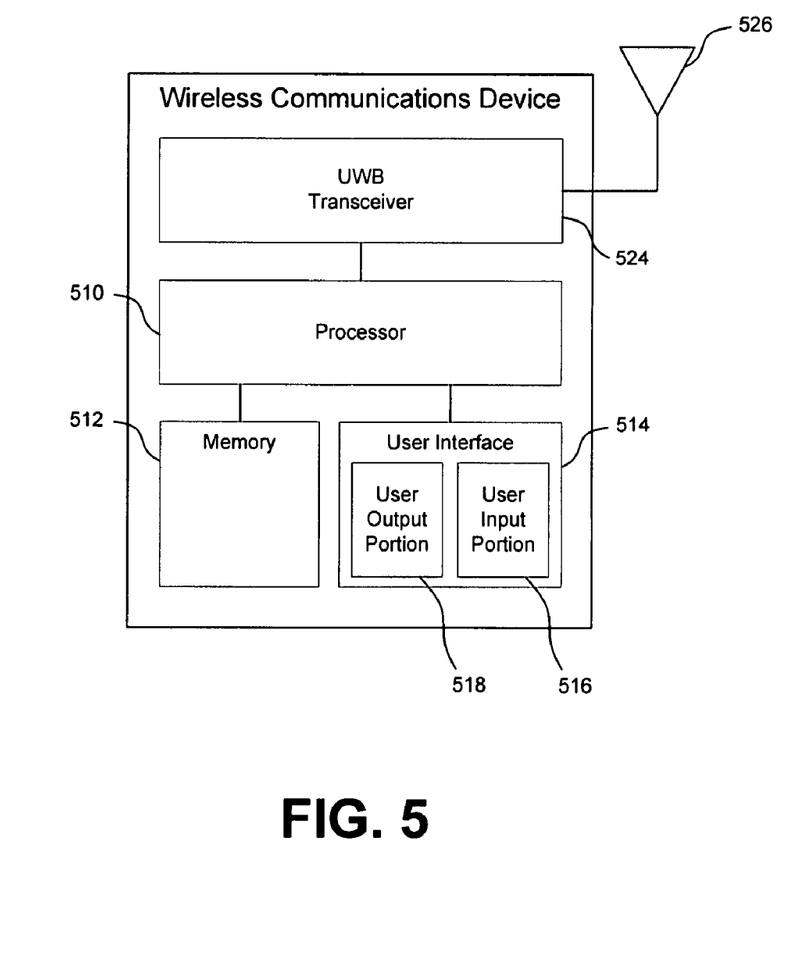
FIG. 5 is a diagram of a wireless communications device according to an embodiment of the present invention.

As described above, wireless communications devices, such as DEVs 102, may employ the techniques of the present invention. Accordingly, such devices may be implemented in hardware, software, firmware, or any combination thereof. One such implementation is shown in FIG. 5. This implementation includes a processor 510, a memory 512, and a user interface 514. In addition, the implementation of FIG. 5 includes a UWB transceiver 524 and an antenna 526.

As shown in FIG. 5, UWB transceiver 524 is coupled to antenna 526. UWB transceiver 524 includes electronics, which allow the device (in conjunction with antenna 526) to exchange wireless UWB signals remote devices, such as other DEVs 102. Accordingly, transceiver 524 may include a transmitter and a receiver. For the transmission of UWB signals, such electronics may include modulation components (e.g., OFDM modulators) and/or a pulse generator for certain types of impulse UWB transmissions. For the reception of UWB signals, such electronics may include demodulation components (e.g., OFDM demodulators), timing circuitry, and filters.

As shown in FIG. 5, processor 510 is coupled to transceiver 524. Processor 510 controls device operation. Processor 510 may be implemented with one or more microprocessors that are each capable of executing software instructions (program code) stored in memory 512.

Memory 512 is a computer readable medium that may include random access memory (RAM), read only memory (ROM), and/or flash memory, and stores information in the form of data and software components (also referred to herein as modules). These software components include instructions (e.g., logic) that can be executed by processor 510. Various types of software components may be stored in memory 512. For instance, memory 512 may store software components that control the operations of transceiver 524. Also, memory 512 may store software components that provide for the functionality of a media access controller (MAC). This controller may perform various features, such as the steps described with reference to FIG. 3. It is important to note that the MAC may be implemented in hardware, software, firmware, or any combination thereof.

In addition, memory 512 may store software components that control the exchange of information through user interface 514. As shown in FIG. 5, user interface 514 is also coupled to processor 510. User interface 514 facilitates the exchange of information with a user. FIG. 5 shows that user interface 514 includes a user input portion 516 and a user output portion 518. User input portion 516 may include one or more devices that allow a user to input information. Examples of such devices include keypads, touch screens, and microphones. User output portion 518 allows a user to receive information from the wireless communications device. Thus, user output portion 518 may include various devices, such as a display, and one or more audio speakers. Exemplary displays include liquid crystal displays (LCDs), and video displays.

The elements shown in FIG. 5 may be coupled according to various techniques. One such technique involves coupling transceiver 524, processor 510, memory 512, and user interface 514 through one or more bus interfaces. In addition, each of these components is coupled to a power source, such as a rechargeable and/or removable battery pack (not shown).

VIII. Reserved Beacon Slot

As described above, the initial MBOA MAC version draft specifies a fixed size beacon period having 8 MAS slots (i.e., 24 beacon slots). Also, the idea of leaving the last beacon slot (i.e., the 24$^{th}$ slot) free has been discussed. The purpose of this idea is to allow possible additional devices to announce the establishment of new beacon period(s) occurring elsewhere in the superframe.

Embodiments of the present invention also reserve a beacon slot in a particular beacon period. However, instead of just involving the establishment of new beacon periods, the reserved beacon slot of the present invention may alternatively be reserved for communications regarding beacon period size adjustments. Also, in contrast with the above idea, embodiments of the present invention do not reserve the last beacon slot for such communications. Instead, in embodiments of the present invention, other beacon slots (such as one or more beacon slots in the first MAS) may be reserved.

Reserving the last slot for such communications may be disadvantageous when flexible beacon periods are employed. This is because the location of last beacon slot in the corresponding superframe will not remain constant. Accordingly, problems may arise by reserving the last slot. For example, if one device uses a beacon period differing in length from beacon periods employed by other devices, these devices may not be able to coordinate communications involving beacon period size adjustments.

Reserving a beacon slot during the first MAS slot of a beacon period avoids this problem because the first MAS (and its internal beacon slots) will always exist in the corresponding beacon period. Accordingly, such reservations advantageously free nodes from the requirement of using the same beacon period length.

As described above, the initial MBOA MAC version specifies beacon frames having information elements (IE) that, according to embodiments of the present invention, may convey information indicating the number of used beacon slots. An example of such an IE is a modified BPOIE. In addition to information elements, the initial MBOA MAC version specifies that beacon frames also include information called beaconing group parameters. In embodiments of the present invention, the beaconing group parameters of the initial MBOA MAC version may be modified to include information regarding beacon period length.

Figure 6:
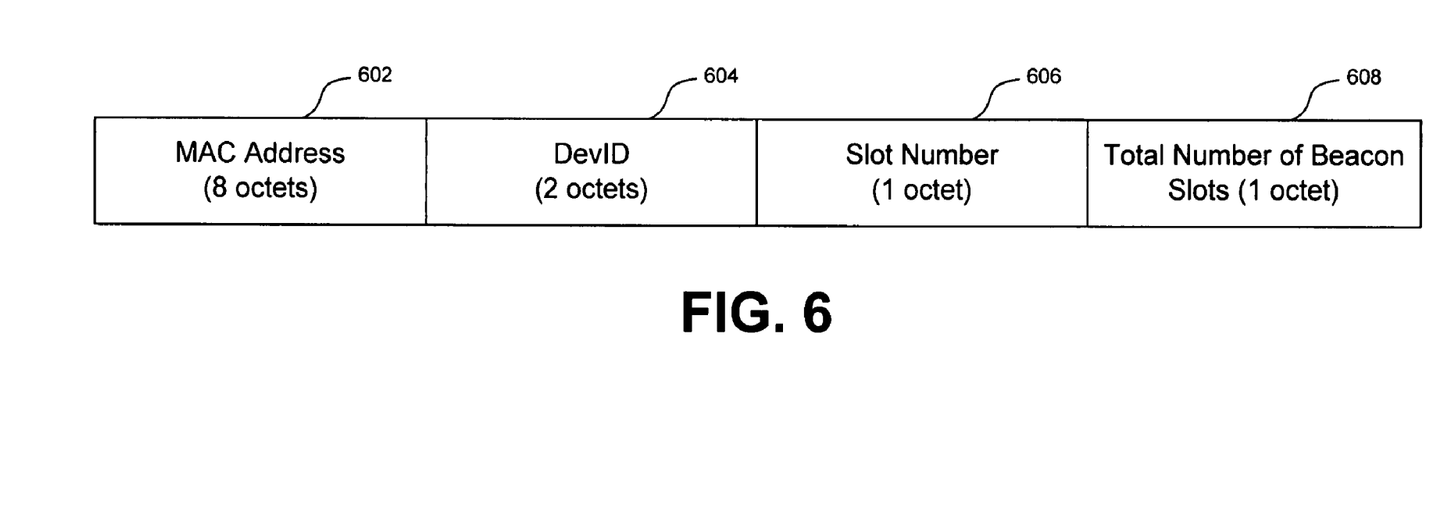
FIG. 6 is an exemplary diagram of beaconing group parameters according to an embodiment of the present invention.

Accordingly, FIG. 6 is a diagram of modified beacon period parameters 600 according to an embodiment of the present invention. Devices, such as DEVs 102 may transmit parameters 600. As shown in FIG. 6, parameters 600 may include a MAC address field 602, a DEVID field 604, a slot number field 606, and a total number of beacon slots field 608. Fields 602, 604, and 606 are specified by the initial MBOA MAC version. However, field 608 is an additional field reserved for communicating information relating to the total number of beacon slots in the beacon period used by the transmitting device.

MAC address field 602 identifies the MAC address of the device that transmitted the information element. As shown in FIG. 6, field 602 is eight octets in length. DEVID field 604 provides the device ID of the device that transmitted the information element. This field is two octets in length. Slot number field 606 identifies the beacon slot of the beaconing group in which the beaconing frame is transmitted. This field is one octet in length.

Field 608 identifies the beacon period length (i.e., the number of beacon slots) of the beacon period used by the transmitting device. This field may be one octet in length.

As described above, aspects of the present invention reserve one or more beacon slots (e.g., a beacon slot within the first MAS of the beacon period) for sharing network information. These reserved slots (signaling slots) may provide various features. For example, if a device is unable to find a vacant beacon slot that each of its neighbor devices is listening to, it can transmit a demand to increase the beacon period length of its neighbors. This demand may involve transmitting a beacon within one of the signaling slots that indicates the need for increasing the beacon period length. Also, these reserved beacon slots may also be used to request information about devices and other superframe configuration related purposes. In embodiments of the present invention, such information could include, for example, information relating to initiating a second beacon period within the superframe or other information that affects the current or subsequent superframes.

With such information, a device may decrease the number of beacon slots in a beaconing group. In embodiments, such decreases are performed when certain condition(s) occur. An example of such a condition is when a device or its neighboring devices (seen from BPOIE) have not received any beacons transmitted during the highest beacon slot of the beacon period for a predetermined number of superframes. This predetermined number may be a system parameter having a name, such as "mMaxLostBeacons".

In addition to the above features, devices may also use the reserved beacon slot to create new beaconing groups. When doing so, a device may select and specify an adequate number of beacon slots for a new beaconing group.

Figure 7:
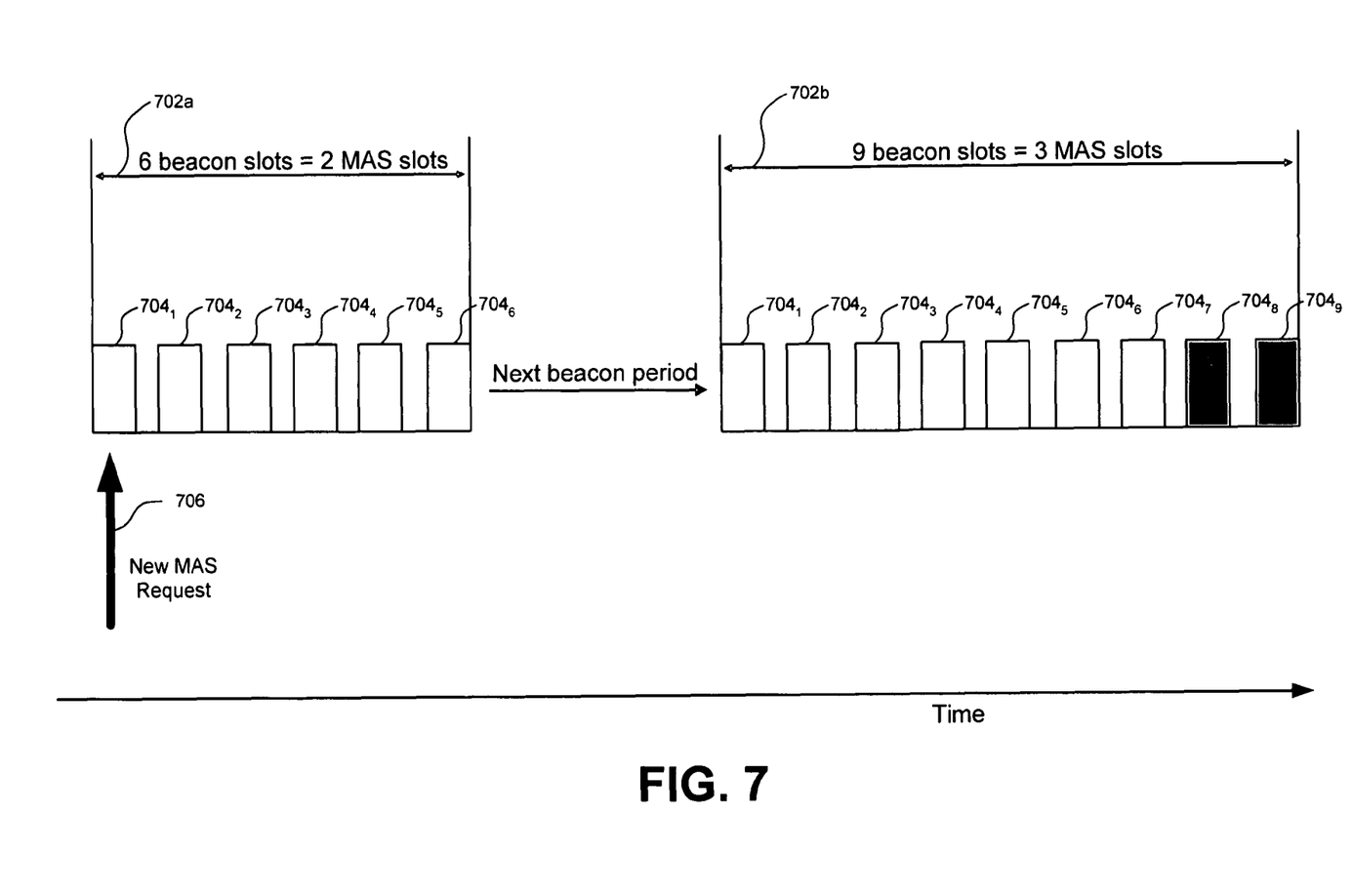
FIGS. 7 and 8 are diagrams showing the use of a reserved beacon slot to adjust the number of slots in a beacon period according to an embodiment of the present invention.
Figure 8:
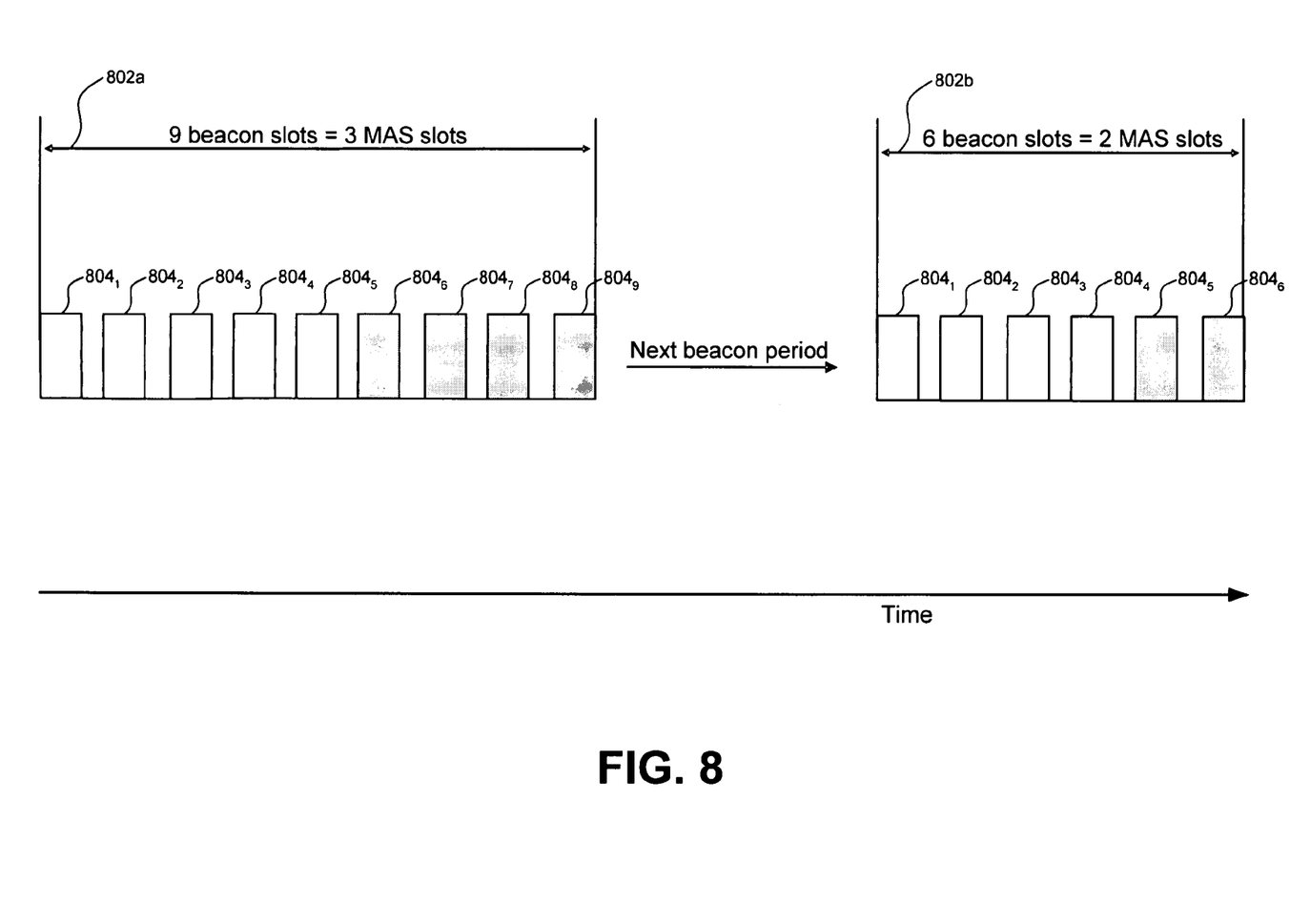

FIGS. 7 and 8 are diagrams showing the use of a reserved beacon slot to adjust the number of slots in a beacon period according to an embodiment of the present invention. These diagrams indicate beacon slots, in which vacant slots are indicated by shading. FIG. 7 is a diagram showing a reserved beacon slot being used to increase the number of beacon slots in a beaconing period. In particular, FIG. 7 shows a beacon period $702a$ having six beacon slots $704_1$-$704_6$.

Beacon slot $704_1$ is reserved for communications involving beacon period adjustments. Accordingly, during slot $704_1$, a device transmits a beacon indicating a request 706 for increasing the beacon period length. In response to this request, a following beacon period $702b$ in the next superframe includes nine beacon slots $704_1$-$704_9$. Of these, slots $704_8$ and $704_9$ are vacant. However, slot $704_7$ in beacon period $702b$ is reserved by the new device that transmitted new request 706.

In embodiments of the present invention, slots other than slot $704_1$ may be reserved for communications involving beacon period adjustments. For example, slots $704_2$ or $704_3$ may be reserved for this purpose.

FIG. 8 is a diagram showing a decrease in the number of beacon slots for successive beacon periods. In particular, FIG. 8 shows a beaconing period $802a$ having nine beaconing slots $804_1$-$804_9$. Of these, slots $804_6$-$804_9$ are vacant. Accordingly, a following beacon period $802b$ in the next superframe has only six beacon slots $804_1$-$804_6$. This reduction may occur through communication(s) transmitted during beacon slot $804_1$.

As shown in FIG. 8, beacon slots $804_5$ and $804_6$ of beacon period $802b$ are vacant. Accordingly, the number of devices occupying the beacon period has changed. However, a change in the number of devices isn't necessarily required for a change in the number of beacon slots to occur.

Figure 9:
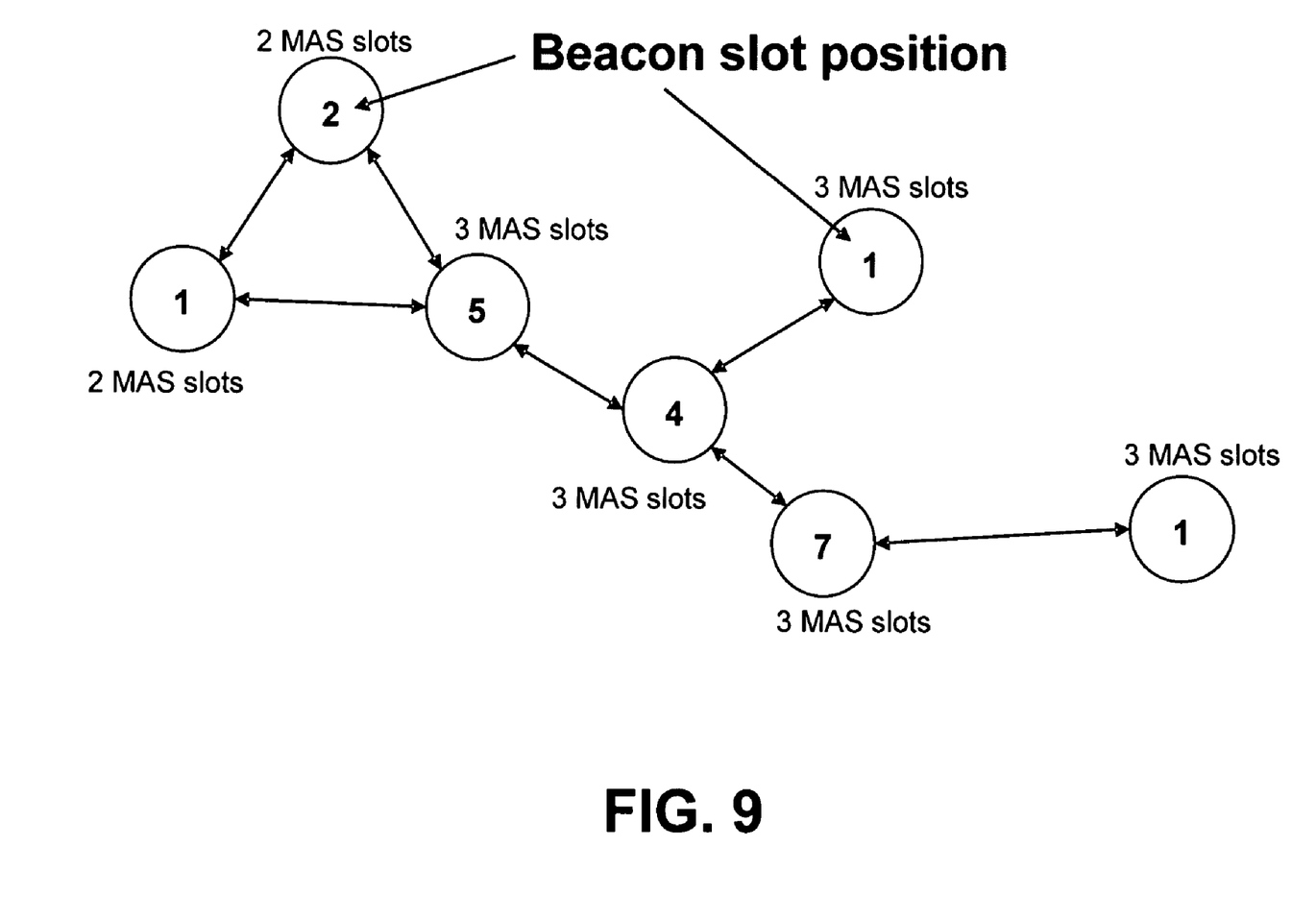
FIG. 9 is a diagram of an exemplary network topology according to an embodiment of the present invention.

As described above, reserving one or more beacon slots in the first MAS of a beaconing period as signaling slots allows flexibility and interoperability between devices in a beaconing group, even in cases where different devices use different length beacon periods. Accordingly, FIG. 9 is a diagram of an exemplary network topology in which different devices (nodes) employ different numbers of beacon slots. In addition, the topology illustrates that particular beacon slots are reserved for a device's neighbors and the neighbors' neighbors.

Various operations may employ the reserved beacon slot that is provided in embodiments of the present invention. For instance, the operation of FIG. 3 may be performed in such embodiments. However, in such performances, steps 310 and 312 involve generating and transmitting a message in the reserved beacon slot. This message may direct an increase or a decrease in the number of beacon slots (e.g., the number of MASs) allocated to the corresponding beacon group.

Accordingly, a device (such as the device of FIG. 5) may receive a plurality of beacon messages across a wireless transmission medium; determine a number of beacon slots for a group of one or more devices based on the received beacon messages; and send a message to allocate the determined number of beacon slots to the group. This message may be sent during a reserved beacon slot in a first Media Access Slot (MAS) occurring in the beginning of a beacon period. Further, this message may direct an increase or a decrease in the number of beacon slots. The determined number of beacon slots may be based on the number of devices in the network (the ad hoc network).

IX. Employment of Multiple Beacon Slots

As described above, various wireless networks employ a repeating time interval. Portions of this time interval may be allocated to wireless communications devices for their transmissions. For instance, MBOA provides a superframe having multiple beacon slots. Referring again to the exemplary superframe format shown in FIG. 2, each superframe 200 has a beacon period (BP) 204. Further, each BP includes a plurality of slots 204. These slots within each BP 204 are referred to as beacon slots.

Conventionally, an MBOA device is allocated a single beacon slot for its beacon transmissions. However, in embodiments of the present invention, a device may be allocated multiple (e.g., two) beacon slots for it to send its beacon transmissions. Thus, for one or more particular superframes, the device sends two beacons.

This feature may be used, for example, to adjust the beacon period length for a beaconing group. In this case, a device sends a beacon in a signaling slot (a beacon slot during the first MAS). In addition, the device also sends a beacon in its regular beaconing slot so as to not lose the regular beaconing slot to some other device. If the regular beaconing slot is lost, it takes time to find a new regular beacon slot. This time leads to data transfer interruptions. Therefore, aspects of the present invention advantageously allow devices to send two beacon transmissions in a single beacon period.

Figure 10:
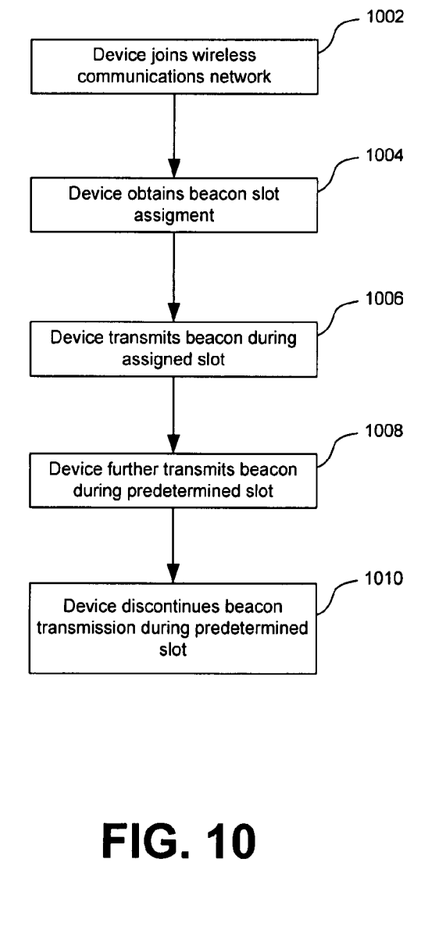
FIG. 10 is a flowchart of an operational sequence, according to embodiments of the present invention

FIG. 10 is a flowchart illustrating an exemplary operation of a device as it participates in a wireless communications network, such as an MBOA network.

As shown in FIG. 10, this operation includes a step 1002, in which a device joins the wireless communications network. The joining may be a result of two networks (or beaconing groups) merging into a single beaconing group.

In a step 1004, the device obtains a beacon slot assignment. This assignment may be obtained by the device listening to transmissions during previous superframe(s) and identifying a beacon slot that appears to be free.

Upon this identification, the device commences transmitting beacon messages during the assigned beacon slot in a step 1006.

In a step 1008, the device further transmits its beacon message in a predetermined beacon slot. Accordingly, during each superframe the device may transmit its beacon twice: once in the predetermined beacon slot and once in the slot assignment obtained in step 1004. In embodiments, this predetermined beacon slot is the first beacon slot of the superframe (referred to herein as "beacon slot zero"). In embodiments, the beacon message(s) transmitted in this step may be used to direct other devices in the network to extend their observed (or employed) beacon period within the superframe.

In alternate embodiments of the present invention, this predetermined beacon slot is randomly chosen among predetermined beacon slots in the beginning of the beacon period (i.e., signaling slots) of the superframe. According to embodiments of the present invention, this randomly selected slot may be from the first, second, and third beacon slots of the first MAS. As described above, these beacon slots of the first MAS are referred to as signaling slots and are reserved for communicating temporary network information within the wireless communications network.

In a step 1010, the device discontinues transmitting beacons during the predetermined beacon slot. In embodiments, this step is performed upon the occurrence of one or more events. In further embodiments, the step is performed after a predetermined amount of time has elapsed.

According to the techniques of the present invention, devices may receive multiple (e.g., two) copies of a beacon during a single superframe. These beacons will each indicate (e.g., by DEV ID) that they originated from a single device. In embodiments of the present invention, devices receiving two such beacons will not discard the beacons as being a device conflict when at least one of the beacons was transmitted within the predetermined beacon slot.

X. Conclusion

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

For instance, the tables contained herein are provided as examples. Thus, other table values, mappings, code types are within the scope of the present invention. Also, the present invention may be employed in communications contexts other than ones based on the MBOA MAC.

What is claimed is:

1. A method, comprising:
   (a) receiving beacon messages across a wireless transmission medium from two or more devices configured for communicating wirelessly using repeating patterns of superframes in a wireless communications network, each of the superframes including at least one beacon period during which each of the two or more devices is configured to transmit a beacon message in an assigned beacon slot including identifications of all devices belonging to the network announced to the network by a device sending the beacon transmission, said beacons maintaining coordination between the devices in the network by enabling each device in the network to respectively reserve at least one beacon slot in the at least one beacon period;
   (b) joining the wireless communications network;
   (c) obtaining one of the plurality of beacon slots as an assigned beacon slot;
   (d) transmitting two copies of a beacon message, one during the assigned beacon slot and the other during a signaling slot of the at least one beacon period.

2. The method of claim 1, further comprising:
   discontinuing transmission of the beacon message during the signaling slot upon the occurrence of one or more events.

3. The method of claim 1, further comprising:
   discontinuing transmission of the beacon message during the signaling slot after a predetermined amount of time elapses.

4. The method of claim 1, wherein step (d) comprises transmitting the beacon message during the signaling slot upon a random occurrence of a predetermined probability.

5. The method of claim 1, further comprising randomly selecting the signaling slot from among two or more predefined signaling slots within the at least one beacon period.

6. The method of claim 1, wherein the signaling slot is reserved for sharing network information between devices of the wireless network.

7. The method of claim 1, wherein the signaling slot is reserved for increasing the number of beacon slots designated within the at least one beacon period for beacon transmissions.

8. The method of claim 1, wherein the signaling slot comprises a beacon slot in the beginning of the at least one beacon period.

9. The method of claim 1, wherein the signaling slot comprises a beacon slot of a first media access slot (MAS).

10. The method of claim 9, wherein the first MAS includes three first occurring slots within the at least one beacon period.

11. The method of claim 1, wherein the wireless communications network is an MBOA network.

12. The method of claim 1, wherein step (d) comprises transmitting ultra wideband (UWB) signals.

13. A wireless communications device, comprising:
   a receiver configured to receive beacon messages across a wireless transmission medium from two or more devices configured for communicating wirelessly using repeating patterns of superframes, each of the superframes including at least one beacon period during which each of the two or more devices is configured to transmit a beacon message in an assigned beacon slot including identifications of all devices belonging to the network, announced to the network by a device sending the beacon transmission, said beacons maintaining coordination between the devices in the network by enabling each device in the network to respectively reserve at least one beacon slot in the at least one beacon period;
   a controller configured to obtain one of the plurality of beacon slots as an assigned beacon slot for the wireless communications device; and
   a transmitter configured to send two copies of a beacon message, one during the assigned beacon slot and the other during a signaling slot within the at least one beacon period.

14. The wireless communications device of claim 13, wherein the controller is further configured to cause the transmitter to discontinue transmission of the beacon message during the signaling slot upon the occurrence of one or more events.

15. The wireless communications device of claim 13, wherein the controller is further configured to cause the transmitter to discontinue transmission of the beacon message during the signaling slot after a predetermined amount of time has elapsed.

16. The wireless communications device of claim 13, wherein the controller is further configured to cause the transmitter to transmit the beacon message during the signaling slot upon a random occurrence of a predetermined probability.

17. The wireless communications device of claim 13, wherein the controller is further configured to randomly select the signaling slot from among two or more predefined signaling slots within the at least one beacon period.

18. The wireless communications device of claim 13, wherein the signaling slot is reserved for sharing network information between devices of the wireless network.

19. The wireless communications device of claim 13, wherein the signaling slot is reserved for increasing the number of beacon slots designated within the at least one beacon period for beacon transmissions.

20. The wireless communications device of claim 13, wherein the signaling slot comprises a beacon slot in the beginning of the at least one beacon period.

21. The wireless communications device of claim 13, wherein the signaling slot comprises a beacon slot of a first media access slot (MAS).

22. The wireless communications device of claim 21, wherein the first MAS includes three first occurring slots within the at least one beacon period.

23. The wireless communications device of claim 13, wherein the wireless communications network is an MBOA network.

24. The wireless communications device of claim 13, wherein the transmitter is configured to transmit ultra wideband (UWB) signals.

25. A non-transitory computer readable medium, comprising: a non-transitory computer readable medium, having computer program logic recorded thereon for enabling a processor in a computer system to control a wireless communications device; program code stored in the non-transitory computer readable medium, for enabling the wireless communications device to receive beacon messages across a wireless transmission medium from two or more devices configured for communicating wirelessly using repeating patterns of superframes in a wireless communications network, each of the superframes including at least one beacon period during which each of the two or more devices is configured to transmit a beacon message in an assigned beacon slot including identifications of all devices belonging to the network announced to the network by a device sending the beacon transmission, said beacons maintaining coordination between the devices in the network by enabling each device in the network to respectively reserve at least one beacon slot in the at least one beacon period; program code stored in the non-transitory computer readable medium, for enabling the wireless communications device to join the wireless communications network; program code stored in the non-transitory computer readable medium, for enabling the wireless communications device to obtain one of the plurality of beacon slots as an assigned beacon slot; program code stored in the non-transitory computer readable medium, for enabling the wireless communications device to transmit two copies of a beacon message one during the assigned beacon slot and the other during a signaling slot of the at least one beacon period.

26. A system, comprising:

a plurality of nodes forming a wireless communications network and each configured for receiving beacon messages across a wireless transmission medium from two or more other nodes in the network, configured for communicating wirelessly using repeating patterns of superframes, each of the superframes including at least one beacon period during which each of the two or more nodes is configured to transmit a beacon message in an assigned beacon slot including identifications of all nodes belonging to the network, announced to the network by a node sending the beacon transmission, said beacons maintaining coordination between the nodes in the network by enabling each node in the network to respectively reserve at least one beacon slot in the at least one beacon period, said beacon period having a plurality of beacon slots and a plurality of signaling slots;

wherein at least one of the plurality of nodes reserves one of the plurality of beacon slots and transmits two copies of a beacon message, one in the reserved beacon slot and the other in one of the signaling slots.

27. A wireless communications device, comprising:

means for receiving beacon messages across a wireless transmission medium from two or more devices configured for communicating wirelessly using repeating patterns of superframes in a wireless communications network, each of the superframes including at least one beacon period during which each of the two or more devices is configured to transmit a beacon message in an assigned beacon slot including identifications of all devices belonging to the network announced to the network by a device sending the beacon transmission, said beacons maintaining coordination between the devices in the network by enabling each device in the network to respectively reserve at least one beacon slot in the at least one beacon period;

means for joining the wireless communications network;

means for obtaining one of the plurality of beacon slots as an assigned beacon slot;

means for transmitting two copies of a beacon message, one during the assigned slot and the other during a signaling slot of the at least one beacon period.

* * * * *